June 30, 1942.        R. C. BOUGHTON        2,288,225
PIPE COUPLING
Filed Feb. 24, 1941        2 Sheets-Sheet 1
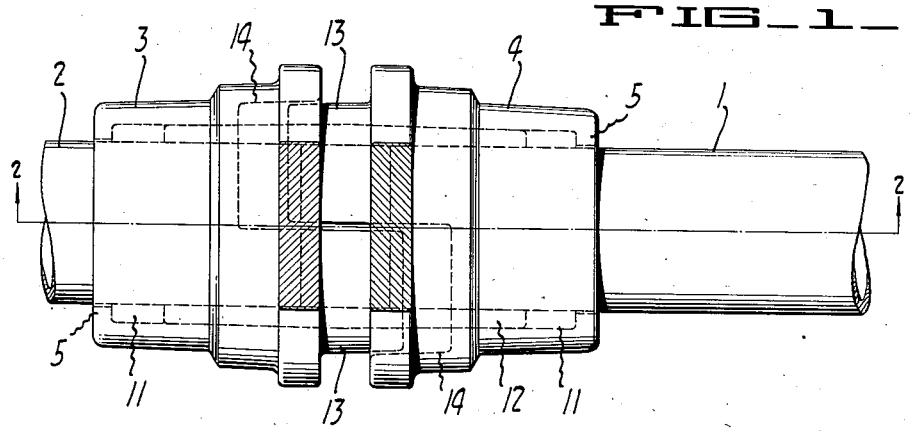
FIG_1_
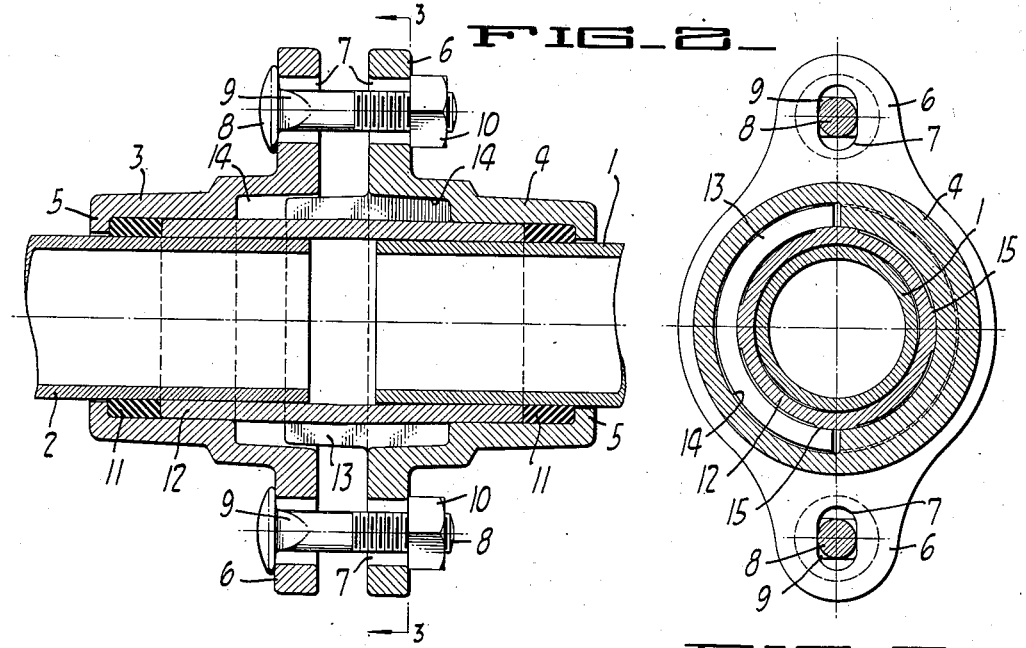
FIG_2_
FIG_3_
FIG_4_
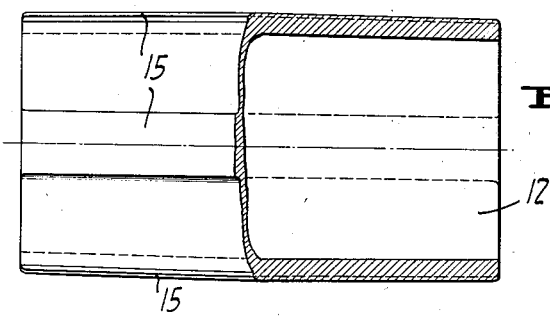
INVENTOR
Roger C. Boughton
BY
ATTORNEYS June 30, 1942.  R. C. BOUGHTON  2,288,225
PIPE COUPLING
Filed Feb. 24, 1941  2 Sheets-Sheet 2
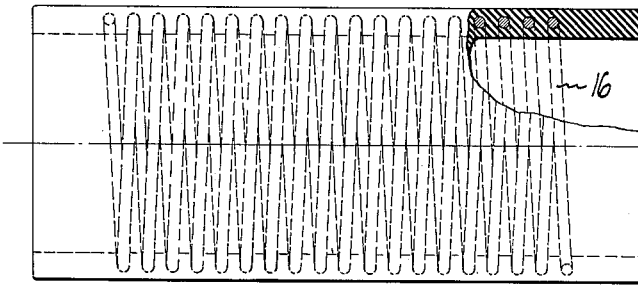
FIG_5_
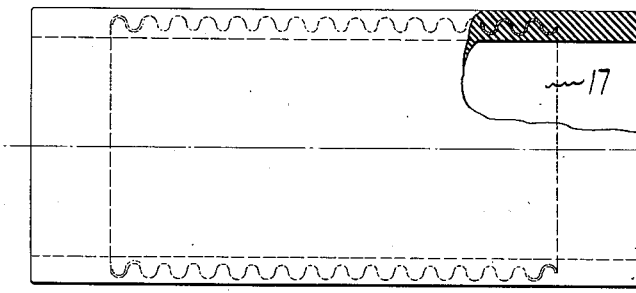
FIG_6_
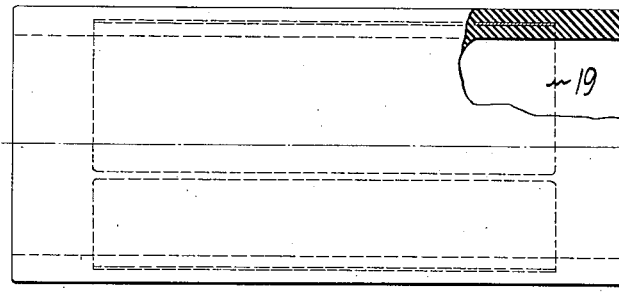
FIG_7_
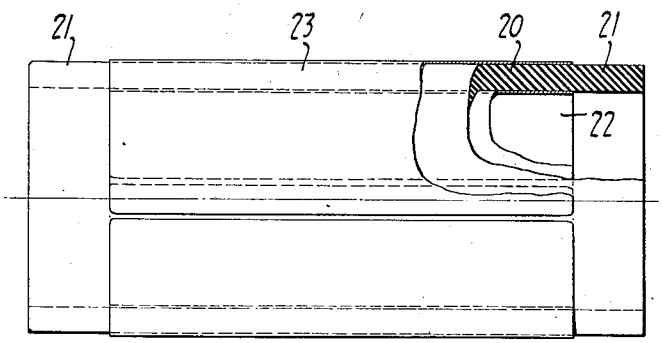
FIG_8_
INVENTOR
Roger C. Boughton
BY
ATTORNEYS Patented June 30, 1942

2,288,225

UNITED STATES PATENT OFFICE 2,288,225

PIPE COUPLING

Roger C. Boughton, San Francisco, Calif.

Application February 24, 1941, Serial No. 380,183

10 Claims. (Cl. 285—142)

This invention relates to a pipe coupling for plain end pipe, and has for several of its objects an economical coupling for such pipe, and which coupling forms a tight seal between lengths of pipe coupled thereby as well as providing means for preventing bursting of the conduit walls in a pipe line due to internal pressure between adjacent ends of the lengths of pipe coupled together by said coupling. Another object is an economical pipe coupling with means for forming a fluid tight coupling between adjacent ends of the pipe lengths in a pipe line, and which coupling also includes a fluid tight conduit between adjacent ends of the pipe lengths connected by said coupling, together with means separable from said conduit and pipe length for reinforcing the latter against bursting under pressure of the fluid in said conduit and pipe line, whereby said conduit may be of a different material from the material of the coupling and pipes.

A still further object is a construction in a pipe coupling for plain end pipe that enables the use of relatively cheap cast metal for interfitting elements of the coupling while providing a relatively tight fit between said elements without resort to expensive machining or grinding to make such fit.

Other objects and advantages will appear in the specification and drawings.

Fig. 1 is a part sectional and part elevational view of my improved coupling at adjacent ends of a pair of pipes in a pipe line.

Fig. 2 is a sectional view along line 2—2 of Fig. 1.

Fig. 3 is a sectional view along line 3—3 of Fig. 2.

Fig. 4 is an enlarged part sectional and part elevational view of the inner sleeve of my coupling taken longitudinally of the sleeve.

Figs. 5, 6, respectively, are part elevational, part sectional views of different types of sleeves in which provision is made for sealing between the terminating ends of pipe lengths.

Figs. 7 and 8, respectively, are part elevational, part sectional views of different types of sleeves formed with relatively soft, compressible end portions and more rigid central portions connecting between said end portions.

In detail the adjacent plain ends of pipes to be coupled together, are indicated in Figs. 1, 2 at 1 and 2, which pipes are disposed in substantially axial alignment.

My coupling for connecting the adjacent ends of pipes 1, 2, comprises a pair of generally tubular cast body members 3, 4 in axial alignment, each formed with a radially inwardly projecting, annular flange 5 at their opposite outer ends, the inner diameter of which flanges is such as to relatively loosely pass the pipes 1, 2 past said flanges into said body members in direction toward each other. The inner adjacent end of said tubular body members are formed with lugs 6 projecting outwardly therefrom at opposite sides of each member, which lugs have substantially oval shaped openings 7 therein with their major axes extending radially of the members. The openings in the lugs on each of said members are in alignment for passing carriage or track bolts 8 therethrough, the widths of the openings being such as to receive the oval or square shank 9 adjacent the head of the bolt in any one of such openings so as to prevent the bolt from turning when the nut 10 on each bolt is tightened to draw the lugs together. These oval shaped openings permit slight shrinkage or distortion in the castings of the tubular members that might otherwise make the insertion of the bolts difficult if not impossible.

Within each of said body members, 1, 2 and against flange 5 of each of said members, is a relatively soft rubber gasket or collar 11 and extending between said gaskets is an open ended sleeve 12, said sleeve extending across the space between the adjacent ends of pipes 1, 2 as well as across the line of division between the body members 3, 4.

Each of said body members 3, 4 is provided at its end opposite flange 5 with an axially extending, semi-cylindrical tongue 13, extending into a generally complementarily formed, semi-cylindrical recess 14 in the other member. As both of the body members 3, 4 are identical in structure it will be seen that each carries an axially outwardly projecting tongue 13 extending half way around each member, and the bore of each member is formed with a recess extending oppositely of the tongue thereof around the remaining half of each member. The terminating edges of each tongue and the terminating ends of each recess, circumferentially of the bores of each member, terminate substantially in a plane disposed longitudinally of the members and centrally of the lugs 6. The total overall length of sleeve 12 and collars 11, when the flanges 5 are positioned to draw the sleeve and collars 11 together, is such that the axially outer ends of tongues 13 will be spaced from the axially facing ends of recesses 14, and also the radially outwardly facing sides of said tongues are spaced from the radially inwardly facing sides of said recesses. Thus, when nuts 10 are tightened, the tongues will move axially farther into the recesses 14 and the radially facing adjacent sides of the tongues and recesses will be brought closer together, and the rubber collars will be forced radially into tight sealing engagement at their radially inner and outer sides against the pipes and body members.

From the foregoing explanation, it will be clear that the tongues 13 not only extend across the space between lugs 6 to protect the sleeve against the earth and external impurities, but said tongues also reinforce the sleeve against the danger of bursting where the latter extends between the body members.

The sleeve 12 is slightly barrel shaped, the sides bowing slightly outwardly from their ends toward the center, thus when the adjacent end portions of pipes 1, 2 are disposed within the sleeve, the adjacent terminating ends of said pipes may swing slightly in the sleeve, which provides flexibility in laying pipe to permit the pipe line to follow ground contour. The radially inner sides of the body members that are next to the outer sides of the sleeve are shaped to substantially follow the barrel shaped, longitudinal contour of the outer sides of the sleeve.

In Fig. 1, it is seen that the tubular bore of each body member adjacent the rubber collar 11, receives one end of the sleeve, and this fit should be fairly close. The preferred form of sleeve shown in Figs. 1 to 3, and Fig. 4, are malleable cast iron, as are the body members 3, 4. This form is preferable for general use, and it has been found practically impossible to make body castings that are circumferentially true, due to shrinkage, warpage, etc., and die straightening equipment to make body castings absolutely and truly round would be very expensive in first cost and the mechanical operation of trueing the castings would add to the cost of each. To make cast sleeves absolutely and truly round would require somewhat similar equipment and would also involve an expensive production operation.

I have found that a satisfactory fit can be produced by forming slightly raised ribs 15 on the outer sides of the sleeve at spaced points therearound, which ribs extend longitudinally of the sleeve. This provides the sleeves with major and minor axes transversely of the sleeve, at least two ribs being at diametrically opposite sides of the sleeve although preferably, two pairs of ribs at respectively in planes at right angles are provided. The major axis is thus the external diameter of the sleeve taken through one pair of ribs and the minor axis being taken through the sleeves between the ribs. The ribs are substantially of equal depth at all points along their lengths. By this means, I have found that the sleeves will fit the bores of the body casting at their ends irrespective of the variation in the body castings or sleeves, by turning the sleeve on its axis until the point is reached where the inner and outer contours of the bores in the body members and the outer sides of the sleeves, will fit so that the end edges of the sleeve will slide to position tight against the rubber collars 11.

This sleeve 12, is in some instances, where used on pipe lines for carrying food products, covered with baked enamel, porcelain, or rubber applied by the anodic process, and where the pipes carry chemicals that would attack the iron, they are treated by any one of a number of plating processes, such as galvanizing, tinning, cadmium, plating, etc., and the bolts and nuts 8, 10 as well as the body members may also be galvanized or otherwise treated to resist corrosion from the outside.

The gaskets or collars 11 are preferably of rubber composition, having a durometer reading of about 70, but under special conditions, they may be of asbestos, woven lead, lead packing, etc. provided sufficiently soft to form a tight seal between the pipe and body member and sleeve, when the body members are drawn together by the bolts and nuts.

While the above sleeve of metal is the preferred form, I may use sleeves of composition plastic materials, such as Bakelite, or they may be of glass, terra cotta, hard rubber or other metals, and in some instances the rubber collars 11 are substantially integrally united with hard rigid sleeves of various materials.

In Figs. 5, 6 is one type of sleeve that is adapted to form a seal at the adjacent ends of the pipe, since said sleeves are of relatively soft rubber of the same reading as that of the collars 11 of Figure 1. In the use of a sleeve of this type the collars are, of course, eliminated.

In Fig. 5 the body of the sleeve is entirely of rubber except for a helical coil 16 of spring wire disposed coaxially of the sleeve and embedded in the rubber with the adjacent turns of the coil spaced apart, and in Fig. 6 a corrugated metal tube 17 coaxial with the body of the sleeve is embedded in the latter. In these instances the coil 16 and the tube 17, terminate short of the ends of the sleeve a distance equal to about the width of the rubber collar 11, that is used with the rigid sleeve.

Upon drawing the body members 3, 4 toward each other when either of the sleeves of Fig. 5 or 6 are in place, the rubber of the sleeve will be forced by compression against the radially outer sides of the adjacent ends of the pipe and will thus seal at said ends as well as at the outer ends of the sleeves, and this action will result in substantially sealing the annular radially inwardly facing cavity between the adjacent ends of the pipes held in the coupling. This result is particularly desirable in food lines, etc., where sediment or impurities might lodge between the pipe and sleeve. The provision of the tongues 13 in this arrangement becomes quite important here, since it eliminates any tendency of the rubber sleeve to be forced outwardly between the body members, and also in this type of sleeve, the same can be truly cylindrical. Heretofore efforts have been made to attain this result, but the weakness resulting from no support of the sleeve at the point between the two body members in a plane extending between the lugs on said body members, has made it objectionable.

In Fig. 7 a longitudinally split metal sleeve 19, coaxial with the soft rubber sleeve is imbedded in the latter, terminating at its ends short of the ends of the rubber sleeve. This form of invention does not provide a center seal between the ends of the pipe that are coupled together, but enables the use of a rubber sleeve with a reinforcement therein that extends across the line of division between the body members of the coupling, and the rubber of the sleeve axially outwardly of the ends of the split metal tube or sleeve 19, functions as compressible gaskets to form the desired seal.

In Fig. 8 the rubber sleeve 20 is confined between the end portions 21 by an inner metal tube 22 and an outer metal tube 23 which tubes may be split longitudinally or not, as desired. In this form of invention, the ends 21 function as compressible gaskets or collars, the same as collars 11 in Fig. 1, but the metal sleeves reinforce the main sleeve 20 where it crosses the line of division between the body members. These metal sleeves 22, 23 may be of different metals according to the conditions incountered. The inner one may be of a relative expensive metal to resist the action of acids or fluids carried by the pipes, which themselves may be of similar material, which the outer metal tube 23 may be of a relatively cheap metal, and in any event the main body members may be of relatively cheap iron since no contact exists between the body members and the fluid conducted by the pipes.

While rubber gaskets or collars 11 are preferred in the construction disclosed in Fig. 1, in some instances where underground pipes are where stray electrical currents are picked up as in the vicinity of car tracks, it may be preferable to use lead collars, since the use of such collars eliminates the damming effect of rubber collars which is objectionable, since said effect results many times in the current jumping through the surrounding soil causing electrolysis at the coupling.

The importance of the tongue and recess arrangement (13, 14 in Figs. 1 to 3) is important, as has already been explained, in protecting the sleeve in the coupling from exterior deterioration by abrasion or corrosion, and it also enables the use of sleeves of Bakelite, rubber, terra cotta, glass, etc., which would otherwise burst at the coupling under relatively high internal fluid pressure.

While the use of baked sand cores would enable making body castings in which the bores of the body castings would fit over longitudinally straight sides of cylindrical sleeves, and while the tongue of one body casting might be made fully cylindrical and the tongue receiving recess in the other casting fully annular, such construction would be more costly and would necessitate a right and left hand body member of different construction. With the construction disclosed, all body castings are alike and the castings may be made using green sand cores, thus obtaining all of the advantages of a more costly construction at a reasonably low cost, which is highly important.

The sleeves shown in Figures 5 to 6, and for general use in Fig. 7, when the center seal is not needed, have the important function of practically eliminating noise due to vibration, resulting from the operation of pumps, water meters or the like and also the metal reinforcing gives the additional strength that permits the use of soft rubber necessary to said function.

Also, it is to be noted that in the use of a soft rubber sleeve as illustrated in Figs. 5 to 7, or 8, the sleeve is formed to absolutely stop compression of the portion extending across the gap between the two pipe ends, after a limited amount of compression has taken place, since the spacing between the adjacent pipe ends cannot be controlled, in ordinary practice and the compression of the ends of the sleeve against the pipe ends due to drawing the body members together, obviously cannot draw the pipes toward each other, particularly where the opposite outer ends of the pipe are fixed, as by screw couplings or where the pipes are long and relatively heavy. The effective compression of the rubber of the sleeve must be for the most part confined to the restricted space between the bores of the body members and the radially outer sides of the pipe ends, in order to make an effective seal and any attempt to rely upon unrestricted radial deformation of the sleeve between adjacent ends of pipe lengths to effect a seal, or to rely upon the sleeve to draw the pipe lengths toward each other to make a seal, is practically worthless.

Having described my invention, I claim:

1. A pipe coupling for plain end pipe comprising: a tubular sleeve adapted to receive and enclose the adjacent ends of a pair of pipe lengths including relatively soft, compressible extensions at opposite ends of said sleeve adapted to embrace such lengths spaced from their adjacent ends; a pair of separable body members respectively formed with coaxial bores embracing opposite end portions of said sleeve including said extensions; a radially inwardly projecting annular flange on each of said body members outwardly of said extension engaging the axially oppositely outwardly facing outer ends of said extensions; said body members being movable toward each other to draw said flanges tight against said extensions for compressing the latter; means for so drawing said body members toward each other and rigid means formed integrally with said body members fully enclosing said sleeve against exposure to injury and supporting the said sleeve at its outer sides against bursting under internal pressure.

2. In a construction as defined in claim 1, said last mentioned means comprising a recess in the side of said bore in one of said members extending circumferentially and axially thereof and a complementarily disposed lip portion on the other member extending axially of the bore therein disposed in said recess.

3. In a construction as defined in claim 1, the portion of said sleeve that extends between said compressible extensions being of cast metal and generally cylindrical, with its outer circumferential contour at its opposite ends being formed to provide major and minor axes at different diametrically opposed points disposed in the same plane and at right angles to the longitudinal axis of the sleeve to facilitate fitting said ends in the bores in said body members.

4. A pipe coupling for plain end pipe comprising: a tubular sleeve having compressible end portions; said sleeve being adapted to receive and embrace adjacent ends of a pair of pipe lengths; a pair of separable body members of metal respectively formed with coaxial bores embracing said sleeve at opposite sides of the line of division between said members including said end portions; a radially inwardly projecting annular flange on each of said body members outwardly of said end portions engaging the axially oppositely outwardly facing ends of said end portions; said body members being movable toward each other to compress said end portions; means for so drawing said end portions toward each other and for securing said body members together; a substantially cylindrical rigid sleeve protector coaxial with the bores in said body members extending over the portion of said sleeve intermediate the ends of the latter enclosing said portion; said protector being separable from said sleeve upon separation of said body members.

5. In a construction as defined in claim 4, said protector being axially split into separable halves and one of said halves being formed integrally with each body member.

6. In a construction as defined in claim 4, said protector being axially split into separable halves respectively carried by said body members and integral therewith, and each of said body members being formed with a recess slidably receiving the half of the protector carried by the other body member, for movement of said halves relatively in direction axially of said bores.

7. A pipe coupling for plain end pipe comprising; a tubular sleeve adapted to receive adjacent ends of a pair of pipe lengths; a pair of separable body members respectively formed with coaxial bores embracing opposite end portions of said sleeve; a substantially cylindrical sleeve protector coaxial with said bores extending over and covering the portion of said sleeve extending between said opposite end portions; and means radially outwardly of said protector securing said sleeve, protector, and body members together as a unit in assembled relation as hereinabove described.

8. In a construction as defined in claim 7, said protector being split axially into halves respectively formed integrally with one of said body members, and said body members including said halves being of identical construction, and said sleeve being substantially cylindrical and of symmetrical construction at opposite sides of a plane bisecting said sleeve transversely therefor thereby facilitating the manufacture and assembly of said coupling in quantity.

9. In a construction as defined in claim 7, said sleeve being of rigid material having compressible end portions at opposite ends thereof, and a radially inwardly projecting flange on each of said body members engaging the axially oppositely outward facing sides of said end portions.

10. In a construction as defined in claim 7, said sleeve being of cast metal and generally cylindrical with generally barrel shaped sides of greater diameter centrally between said ends of pipe lengths adapted to be received in said sleeve so said ends may move radially to permit slight angularity between said lengths at said sleeve, the said bores including said protector being internally formed to substantially fit against the outer sides of said sleeve and said sleeve being externally formed with circumferentially spaced ridges extending longitudinally thereof from opposite ends of said sleeve.

ROGER C. BOUGHTON.